Figure 1:
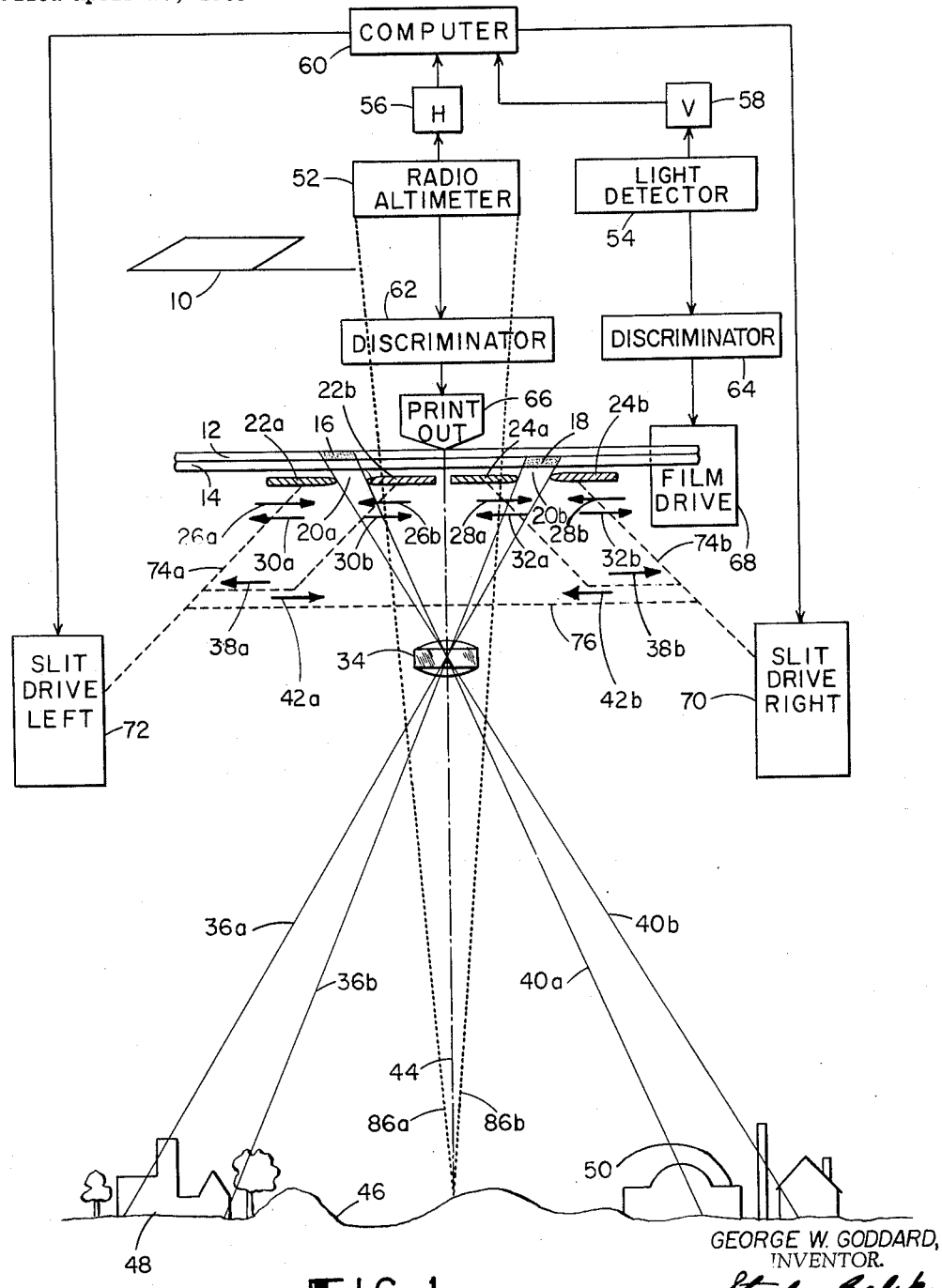

March 15, 1966 G. W. GODDARD 3,240,138
AERIAL CAMERA
Filed April 26, 1963 2 Sheets-Sheet 2

GEORGE W. GODDARD,
INVENTOR.

United States Patent Office 3,240,138
Patented Mar. 15, 1966

3,240,138
AERIAL CAMERA
George W. Goddard, Chevy Chase, Md., assignor to Itek Corporation, a corporation of Delaware
Filed Apr. 26, 1963, Ser. No. 275,878
2 Claims. (Cl. 95—12.5)

My invention relates to data processing systems and in particular to an improved stereoscopic photography system.

The invention herein described has been found to be suitable for stereophotography, where there is relative motion between the subject and the camera and is especially suited for making continuous aerial photographs exhibiting a true stereoscopic effect when viewed. It is within this latter context that I shall describe my invention although I do not wish to be so limited.

The prior art aerial stereophotographic systems continuously photographs the terrain over which the airplane is flying and positions the images so that the resulting photograph has right and left handed pictures adapted to be brought into coincidence in an appropriate viewer to give the effect of a three dimensional view of the terrain.

Another prior art system is to continuously photograph the terrain in different angular projections and at slightly different times. The images recorded at one angular projection are arranged continuously on one side of the longitudinal axis of the film while those images recorded at a second angular projection are arranged continuously on the other side. The resulting photograph also provides a stereoscopic view of the terrain. The same result is attained if two films are used, one to record one angular projection and the second to record the second angular projection.

A variation of the production of the stereoscopic effect manifests itself in the case where both images are projected one upon the other onto the same plane in complementary colors, e.g. red and green. If this two-color image is viewed through two colors (one for each eye), e.g. red and green spectacles, an impression of a spatial image is produced. This system is called the anaglyph process. Topographical relief maps made by this process consists of a two color, zonally displaced print and the zonal displacement, varying according to the difference in altitude of the camera above the object, appears as a plastic model.

One type of aerial photographic apparatus is the shutterless strip camera that accomplishes continuous aerial photography by transporting film across a flat focal plane behind a variable width slit. Film velocity and exposure are controlled by a camera control system. The exposure is controlled (in the camera) by adjusting the width of the slit and the film velocity across the slit as the focal plane modifies or effects the exposure value. As in other types of aerial cameras, the film is pulled through the camera by means of a variable speed motor driving metering rollers and spooled up on a take-up spool. The film runs through the camera steadily, at a rate selected by the camera control system and is capable of photographing at great image motion speeds.

Strip cameras usually utilize two matched, short focal length lenses to provide the same scale image for stereo viewing but, to obtain the stereo effect, the image must be photographed from two slightly different positions. These two views are obtained in the stereo strip camera by locating the slits at different points in the focal plane of either lens so that an object is first photographed through one slit and lens combination and a fraction of a second or seconds later through the second slit and lens combination of the same camera. Since, due to the forward flight of the camera, the image moves from the forward part of the field to the back part of the field, one slit is forward of its lens optical center and the second slit is back of its lens optical center. In most stereo strip cameras, the lens are not set side by side, but instead are located one ahead of the other.

Strip cameras are usually employed at low or medium altitudes at high airplane speeds. At high altitudtes, such as 50,000 feet or higher, the short focal length lenses do not provide useable scale resolution for target identification and hence is unsuited. To attain comparable scale resolution, long focal length lenses must be employed with the disadvantage being that the use of matched long focal length lenses increases the bulk and weight of the photographic assemblage.

To overcome these disadvantages of the prior art systems, I have provided herewith an improved data processing system comprising a single, long focal length lens and a film mounted in the focal plane of the lens. The film includes a first emulsion layer responsive to only one complementary color and a second emulsion layer superposed on a first emulsion layer responsive only to a second complementary color. The first emulsion layer is exposed at a first angular projection when the lens is at the first position and the second emulsion layer is exposed at a second angular projection when the lens is at the second position. The superposed latent images thus produced in the film provide the stereo-optic effect of a three dimensional model of the object when the latent images are processed and viewed through two color spectacles having a first lens responsive to the first color and a second lens responsive to the second color.

It is, therefore, an object of my invention to provide an improved data processing system for high altitude aerial photography.

An other object of my invention is to provide an improved data processing system for high airplane velocity aerial photography.

A further object of my invention is to provide an improved data processing system for stereographic photography.

An object of my invention is to provide an improved data processing system for multicolored stereo photography.

An important object of my invention is to provide an improved data processing system for an aerial stereo strip camera.

Another important object of my invention is to provide an improved data processing system for a single lens stereo strip camera.

A principal object of my invention is to provide an improved data processing system that provides uniform stereo effect regardless of changes in altitude.

Another principal object of my invention is to provide an improved data processing system that provides uniform exposure regardless of changes in illumination.

Yet another principal object of my invention is to provide an improved data processing system that is used at high aircraft altitudes and velocities.

Figure 2:
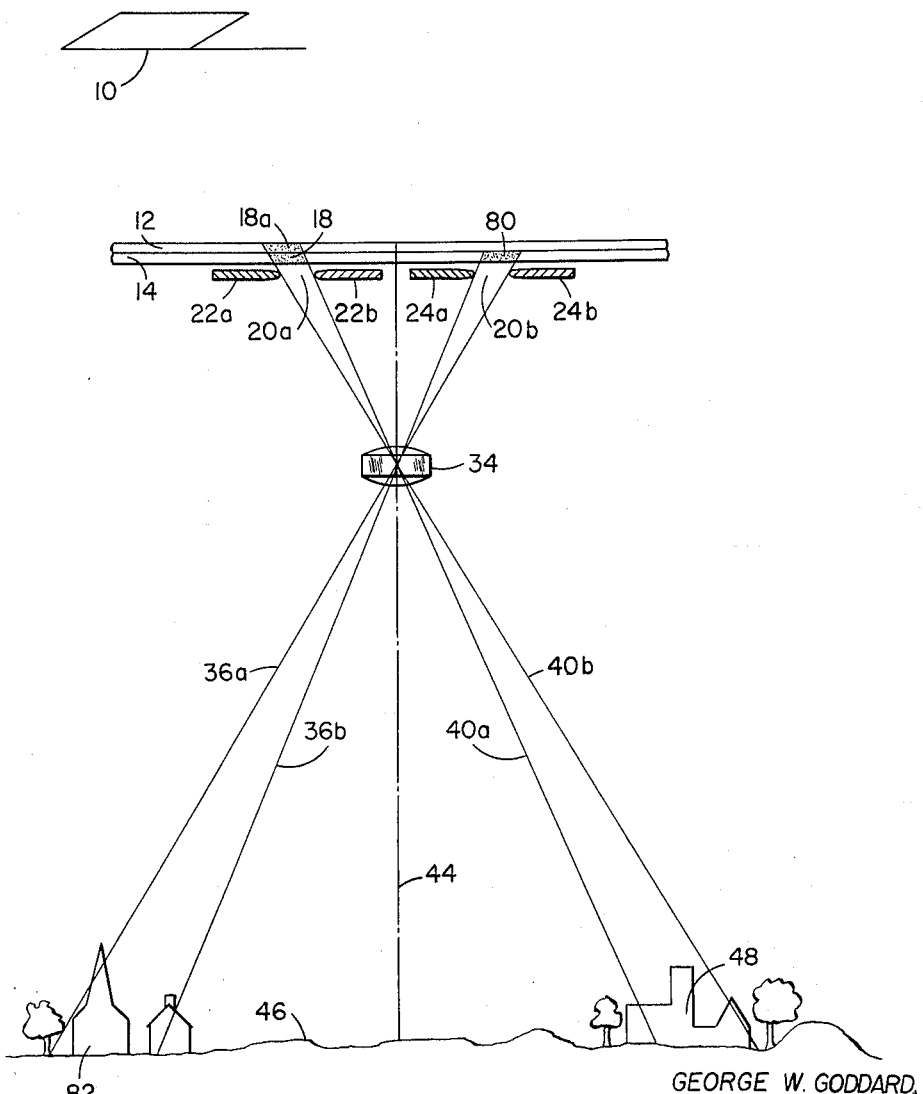

The features of my invention, which I believe to be novel, are set forth with particularity in the appended claims. My invention itself, however, both as to its organization and methods of operation, together with further objects and advantages thereof, may be best understood by reference to the following description, taken in conjunction with the accomapnying drawings in which:

FIG. 1 is a schematic block diagram of a data processing system embodying certain principles of my invention; and FIG. 2 is a schematic diagram of the data processing system of FIG. 1 at a later instant in time.

In FIG. 1 the arrow 10 indicates the direction of flight of the aircraft and also the direction of film travel. The shutterless strip camera of the data processing system has its camera axis 44 orientated perpendicularly to the direction of flight and includes a wide angle, single lens 34 of long focal length, as for example 36 inches. Film 11 is pulled continuously through the focal plane of lens 34 by a variable film drive 68. The film used is a superposed combination of layers of emulsion 12 and 14, deposited on a suitable base not shown.

While the emulsions will be described in terms of being responsive only to certain color combinations, I do not wish to be so limited since other combinations of color responsive emulsions may be used with equal success.

Layer 12 may be peaked to respond to a relatively narrow portion of the visible spectrum corresponding to green light, while layer 14 may be peaked to respond to a relatively narrow portion of the visible spectrum corresponding to blue light. It is well known in the photographic art to place a glass filter or a gelatin filter between the film and the lens to provide primary color separation. Since it is optional as to which is to be used, I have not included the filters in the drawings for purposes of clarity. Nor is any exegesis necessary since those skilled in the art will recall many other appropriate filters to enhance primary color response in film layers.

In a plane parallel to film 11 are a pair of variable width slit apertures 20a and 20b. Slit 20a is formed by a pair of slit blades 22a and 22b while slit 20b is formed by a pair of slit blades 24a and 24b. The center of slits 20a and 20b, respectively, are equidistant from camera axis 44. The maximum distance between the slits 20a and 20b is determined by the focal length of lens 34, as for example, when lens 34 has a 36 inch focal length, the slit separation may be 18 inches to provide correct interocular distance for stereo viewing. Both the width of slits 20a and 20b respectively, and their center distance from camera axis 44 is made variable. The width of slit 20a and its distance from camera axis 44 is controlled by slit drive left 72 and the width of slit 20b and its distance from camera axis 44 is controlled by slit drive right 70. This control is shown by dashed lines 74a and 74b respectively. When the width of slit 20a is to be decreased, slit blade 22a is driven in a direction of arrow 26a while slit blade 22b is simultaneously driven an equal distance in the direction of arrow 26b. Similarly, to decrease the width of slit 20b, slit blade 24a is driven in the direction of arrow 28a while slit blade 24b is simultaneously driven an equal distance in the direction of arrow 28b. To increase the width of slit 20a, slit blade 22a is driven in the direction of arrow 30a while slit blade 22b is simultaneously driven an equal distance in the direction of arrow 30b. To increase the width of slit 20b, slit blade 24a is driven in the direction of arrow 32a and slit blade 24b is simultaneously driven an equal distance in the direction of arrow 32b. To decrease the distance of the center of slit 20a from the camera axis 44, slit blades 22a and 22b are both driven, in unison, in the direction of arrow 38a while slit blades 24a and 24b are both driven, in unison, in the direction of arrow 38b. To increase the distance between the camera axis and the center of slit 20a and 20b, slit blades 22a and 22b, respectively, are both driven, in unison, in the direction of arrow 42a while slit blades 24a and 24b, respectively are both driven, in unison, in the direction of arrow 42b.

This facility for changing slit width and slit distance about the camera axis provides the necessary high altitude stereo-optic control for obtaining maximum data readout. The degree of stereo-optic control is proportional to the instantaneous altitude and toward this end, I provide a radio altimeter 52 for measuring the instantaneous altitude of the aircraft above the intersection of camera axis 44 and terrain 46.

An altimeter 52, preferably a radio altimeter as shown, emits a high frequency signal along a path shown as a dotted line 86a and receives an echo along the path 86b to determine the instantaneous altitude of the aircraft at the time of exposure. The output of altimeter 52 also serves as an input to converter 56 for providing a signal proportional to the altitude and which signal is suitable for use in computer 60, wherein the signal is compared to a reference signal previously inserted in computer 60. This reference signal is a constant determined from the characteristics of film, lens terrain to be photographed, weather conditions, altitude and velocity from optimum data collection and is fed into the system initially, before any pictures are taken. The output of computer 60 is an error signal which is applied to slit drives 70 and 72 for control of the respective slit widths as well as the distances from the axis 44. If the altitude is increasing, slit drive 72 will drive the center of slit 20a closer to camera axis 44 while slit drive 70 will drive the center of slit 20b proportionally closer to camera axis 44.

A second output of radio altimeter 52 is another signal applied as an input to discriminator 62 to drive a printout drive 66 to indicate on the edge of the film the instantaneous altitude at the moment of exposure. This mensuration information provides, during a subsequent viewing of the picture on the film, a means for accurately recreating the conditions which existed at the time of exposure and has particular utility for photo-interpretation purposes.

At this point it is appropriate to confirm, for future usage, that lens 34 (in the absence of any of the slit forming device—22a, 22b, 24a, and 24b) would focus an image of the entire terrain 46 onto film 11. However, since the slits 20a and 20b are present, it should be noted that the slit position with respect to lens 34 determines which portion (50 and/or 48) of the image appears on film 11 while the slit width determines the intensity of the image portion that appears.

The amount of light transmitted to film 11 is physically controlled by the width of slits 20a and 20b respectively. Thus, if the width is increased, exposure is increased, and, conversely, if the width is decreased, exposure is decreased. To maintain exposure within narrow limits, I provide at each of slits 20a and 20b, a terrain light detector 54 for measuring illumination at the slit. The output of detector 54 is the input to converter 58 the output of which is a signal proportional to the luminous intensity and in a form suitable for use as an input to computer 60. In computer 60 the output from converter 58 is compared with a reference value similar to the one previously described to drive an error signal to be transmitted to slit drives 70 and 72, respectively for increasing or decreasing slit widths, as previously described. This maintains the exposure value within defined narrow limits.

As is well known in the art of aerial photography, a change in the ratio of velocity to altitude ($V/H$) of the aircraft not only effects the exposure but also the rate of image scanning across the film. That is, the relative image velocity varies with changes in aircraft velocity and altitude to cause image blur. To overcome this problem, film 11 is driven at a changing rate of speed to prevent image blur, and as is well known in this art, also provides image motion compensation film velocity. In my data processing system the output of converter 58 is compared with the reference of computer 60 to provide a control signal to discriminator 64 which in turn regulates film drive 68 to transport film 11 at a velocity which compensates for image motion.

At any instant in time slits 20a and 20b each have an instantaneous width while the distance between the centers of slits 20a and 20b are equidistant about camera axis 44. This combination determines which portions of terrain 46 appears on film 11. Thus, the width of slit 20a dictates that projection 50 of terrain 46 will be imaged on film 11. The limits of projection 50 are defined by rays 40a and 40b. Similarly, the width of slit 20b dictates that projection 48 of terrain 46 will be imaged on film 11. The limits of projection 48 are defined by rays 36a and 36b. Projection 50 is imaged on film 11 at layer 12 in the area 16 while projection 48 is imaged at layer 14 in the area 18. Thus, we have both an aft looking image of projection 50 and a forward looking image of projection 48 in film 11.

Referring now to FIG. 2, there is shown the data processing system of FIG. 1 at a later instant in time. When reading FIG. 2, it is to be remembered that all the functional groups of FIG. 1 are present in FIG. 2, but have been omitted merely to simplify the drawing. As previously noted, with reference to FIG. 1, the slit width, the distance of the slit centers from camera axis 44, and the film velocity are altered in response to error signals generated by computer 60. Thus, in FIG. 2, lens 34 now images an aft looking image of projection 48 on film 11 while simultaneously imaging a forward looking image of projection 82. The aft looking image of projection 48 is in layer 14 at area 18a superposed on area 18 and the forward looking image of projection 82 is in layer 12 at area 80.

The data processing system thus records one angular projection of an object in one complementary color in one layer of film 11 and a second angular projection of the same object in a second complementary color in a second layer superposed on the first layer to provide a latent image which, after processing is a colored, stereo photograph of the terrain when viewed in a stereo viewer equipped with one lens transmitting only the second color for the other eye of the viewer. The stereo effect is uniform within narrow limits because the data processing system provides automatic control in response to changes in altitude. Data readout is of an optimum quality because the data processing system provides automatic control in response to changes in illumination.

While I have described what is presently considered a preferred embodiment of my invention, it will be obvious to those skilled in the art that various changes and modifications may be made therein without departing from the inventive concept, and it is aimed in the appended claims to cover all such changes and modifications as fall within the true spirit and scope of my invention.

What I claim is:

1. An aerial strip camera for producing a stereoscopic picture of a scene, said camera mounted in a vehicle for transporting said camera over said scene in a predetermined direction, said camera comprising:

a single, wide angle of view, long focal length camera objective lens system, said lens system defining a focal plane and a camera axis of symmetry passing through the projection center of said lens system substantially perpendicular to said focal plane in the plane of said predetermined direction;

a source of film having a base, a first emulsion layer disposed on said base sensitive to substantially only a first complementary color, and a second emulsion layer disposed on said first emulsion layer sensitive to substantially only a second complementary color, said source including means for disposing said film to receive light projected by said lens system;

a first and a second elongated aperture slit each disposed substantially in said focal plane, said slits having parallel, elongated axes transverse to said predetermined direction and symmetrical about said camera axis such that said first slit is aft of said camera axis to define a forward looking projection axis through said projection center and said second slit is forward of said camera axis to define a rearward looking projection axis through said projection center;

means for transporting said film at a predetermined velocity past said first slit to expose an incremental area of one of said layers to a portion of said scene along said forward looking projection axis and for transporting said incremental area past said second slit to expose, at a time interval proportional to said predetermined velocity, an incremental area of the other of said layers that is aligned with said incremental area of said first layer to said portion of said scene along said rearward looking projection axis, to produce two superposed, aligned images of said scene, which when later processed and viewed, yields a stereoscopic picture of said scene;

means for measuring the total luminous flux passing through at least one of said slits;

means comparing said total luminous flux with a predetermined value to provide an indication proportional to the difference between said predetermined value and said total luminous flux; and means responsive to said indication to vary the width of said first slit and said second slit to maintain the total exposure substantially constant.

2. An aerial strip camera for producing a stereoscopic picture of a scene, said camera mounted in a vehicle for transporting said camera over said scene in a predetermined direction, said camera comprising:

a single, wide angle of view, long focal length camera objective lens system, said lens system defining a focal plane and a camera axis of symmetry passing through the projection center of said lens system substantially perpendicular to said focal plane in the plane of said predetermined direction;

a source of film having a base, a first emulsion layer disposed on said base sensitive to substantially only a first complementary color, and a second emulsion layer disposed on said first emulsion layer sensitive to substantially only a second complementary color, said source including means for disposing said film to receive light projected by said lens system;

a first and a second elongated aperture slit each disposed substantially in said focal plane, said slits having parallel, elongated axis transverse to said predetermined direction and symmetrical about said camera axis such that said first slit is aft of said camera axis to define a forward looking projection axis through said projection center and said second slit is forward of said camera axis to define a rearward looking projection axis through said projection center;

means for transporting said film at a predetermined velocity past said first slit to expose an incremental area of one of said layers to a portion of said scene along said forward looking projection axis and for tranporting said incremental area past said second slit to expose, at a time interval proportional to said predetermined velocity, an incremental area of the other of said layers that is aligned with said incremental area of said first layer to said portion of said scene along said rearward looking projection, to produce two superposed, aligned images of said scene, which when later processed and viewed, yields a stereoscopic picture of said scene;

means for measuring the altitude of said camera to produce an indication proportional to its altitude; and means responsive to said indication for changing the interocular distance between said first slit and said second slit to maintain the aerial stereoscopic perspective substantially constant.

References Cited by the Examiner

UNITED STATES PATENTS

| | | | |
|---|---|---|---|
| 2,184,016 | 12/1939 | Mihalyi | 95—57 |
| 2,413,349 | 12/1946 | Hancock | 95—12.5 |
| 2,433,534 | 12/1947 | Sonne | 95—18 |
| 2,568,327 | 9/1951 | Dudley | 95—18 |
| 2,929,305 | 3/1950 | Blackstone | 95—12.5 |
| 3,046,857 | 7/1962 | Kargl | 95—12.5 |
| 3,076,189 | 1/1963 | Goddard | 95—12.5 |

JOHN M. HORAN, *Primary Examiner.*